(12) United States Patent
Neet

(10) Patent No.: US 7,911,105 B2
(45) Date of Patent: Mar. 22, 2011

(54) STATOR WINDING HAVING SAME RADIAL POSITIONS

(75) Inventor: Kirk Neet, Pendleton, IN (US)

(73) Assignee: Remy International, Inc., Anderson, IN (US)

( * ) Notice: Subject to any disclaimer, the term of this patent is extended or adjusted under 35 U.S.C. 154(b) by 274 days.

(21) Appl. No.: 11/972,115

(22) Filed: Jan. 10, 2008

(65) Prior Publication Data

US 2009/0179530 A1 Jul. 16, 2009

(51) Int. Cl.
*H02K 1/00* (2006.01)
*H02K 1/06* (2006.01)

(52) U.S. Cl. . 310/184; 310/201; 310/207; 310/216.001; 310/216.095; 310/216.069; 310/216.132

(58) Field of Classification Search ........... 310/216.071, 310/216.001, 216.069, 216.095, 216.132, 310/184, 201, 207; *H02K 1/00, 1/06*
See application file for complete search history.

(56) References Cited

U.S. PATENT DOCUMENTS

| | | | | |
|---|---|---|---|---|
| 1,723,912 A | * | 8/1929 | Bergman | 310/176 |
| 2,795,712 A | * | 6/1957 | Suhr | 310/198 |
| 3,235,762 A | * | 2/1966 | Brammerlo | 310/185 |
| 3,622,056 A | * | 11/1971 | Droeger | 224/153 |
| 3,631,278 A | * | 12/1971 | Snively | 310/158 |
| 3,719,988 A | * | 3/1973 | Nielsen | 29/596 |
| 3,760,493 A | * | 9/1973 | Snively | 29/596 |
| 3,783,318 A | * | 1/1974 | Widstrand | 310/216.014 |
| 3,807,040 A | * | 4/1974 | Otto | 29/596 |
| 3,942,055 A | * | 3/1976 | Hoffmeyer | 310/216.111 |
| 4,156,822 A | * | 5/1979 | Roddy et al. | 310/216.004 |
| 4,241,274 A | * | 12/1980 | Brammerlo | 310/216.071 |
| 4,982,129 A | * | 1/1991 | Eggert | 310/216.071 |
| 5,998,904 A | * | 12/1999 | Hattori | 310/216.071 |
| 6,414,410 B1 | * | 7/2002 | Nakamura et al. | 310/179 |
| 6,515,393 B2 | * | 2/2003 | Asao et al. | 310/184 |
| 6,886,236 B2 | * | 5/2005 | Higashino et al. | 29/596 |
| 6,940,202 B1 | * | 9/2005 | Chen et al. | 310/184 |
| 7,170,211 B2 | * | 1/2007 | Chen et al. | 310/207 |
| 2004/0012292 A1 | * | 1/2004 | Kometani et al. | 310/184 |
| 2005/0046297 A1 | * | 3/2005 | Chen et al. | 310/180 |
| 2006/0012260 A1 | | 1/2006 | Sadiku et al. | |
| 2007/0007842 A1 | * | 1/2007 | Shim et al. | 310/166 |
| 2009/0179530 A1 | * | 7/2009 | Neet | 310/68 D |
| 2009/0289521 A1 | * | 11/2009 | Yoshino et al. | 310/216.071 |

* cited by examiner

*Primary Examiner* — Quyen Leung
*Assistant Examiner* — John K Kim
(74) *Attorney, Agent, or Firm* — Cantor Colburn LLP

(57) ABSTRACT

Disclosed is an improved stator for a dynamoelectric machine including a stator core which has a plurality of core slots extending axially from a first end of the stator core to a second end of the stator core. The stator also includes a stator winding having a plurality of phases. Each phase of the stator winding includes at least a first filar. The first filar extends around the stator core and form a plurality of layers and has a plurality of slot segments disposed in the plurality of core slots. The slot segments are alternately connected at the first and second ends of the stator core by a plurality of end loop segments. The slot segments are configured such that at least two consecutive slot segments are disposed in substantially the same radial position relative to additional slot segments of the plurality of slot segments disposed in the respective core slots, and the at least two consecutive slot segments are disposed at differing radial distances from a central axis of the stator core.

22 Claims, 11 Drawing Sheets

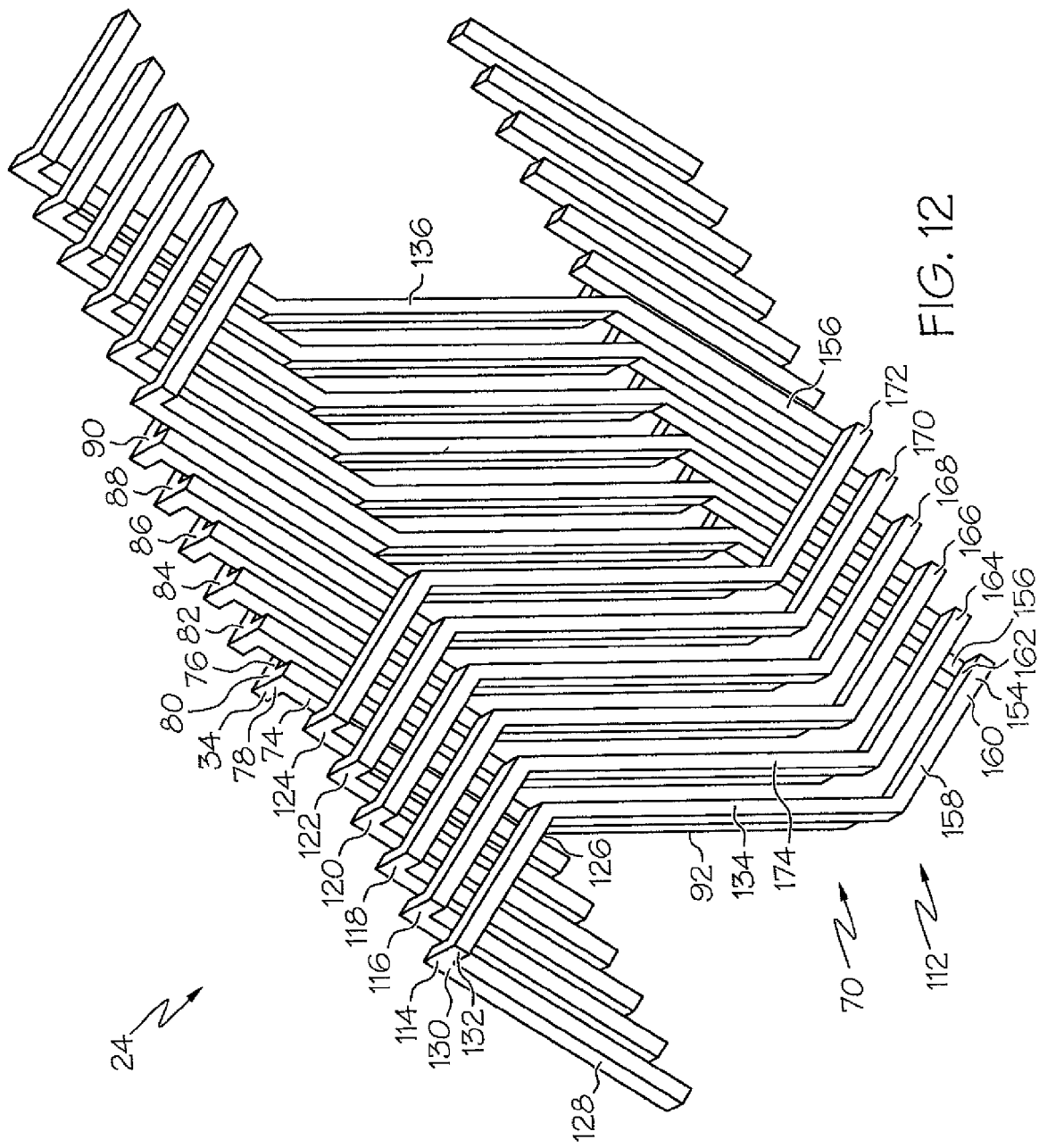

STATOR WINDING HAVING SAME RADIAL POSITIONS

BACKGROUND OF THE INVENTION

The present invention relates generally to dynamoelectric machines. More specifically, this invention relates to a stator winding for a dynamoelectric machine, in which the winding is a cascading winding.

Dynamoelectric machines, such as alternating current generators, or alternators, are well known. Prior art alternators typically include a stator assembly and a rotor assembly disposed in an alternator housing. The stator assembly is mounted to the housing and includes a generally cylindrically-shaped stator core having a plurality of slots formed therein. The rotor assembly includes a motor rotor attached to a generally cylindrical shaft that is rotably mounted in the housing and is coaxial with the stator assembly. The stator assembly includes a plurality of wires wound thereon, forming windings. The stator windings are formed of slot segments that are located in the slots and end loop segments that connect two adjacent slot segments of each phase and are formed in a predetermined multi-phase (e.g. three or six) winding pattern in the slots of the stator core.

A type of stator well known in the art is a high slot fill stator, which is characterized by rectangular shaped conductors that are aligned in one radial row in each slot and that fit closely to the width of the rectangular shaped core slots. High slot fill stators are advantageous because they are efficient and help produce more electrical power per winding than other types of prior art stators. These stators, however, are disadvantageous because the windings are typically interlaced, in which the wires are required to alternate outer and inner radial portions of each slot. These interlaced windings require an interlacing process to interlace the conductors of all the phases prior to inserting the winding into the core and therefore disadvantageously increase the complexity of placing the winding on the stator A particular type of high slot fill stator is one that utilizes bi-filar windings. In a stator utilizing bi-filar windings, each phase turn includes two wires or filars which are connected in parallel. The wire cross section of each filar in a bi-filar design is half of that in a single filar design. Therefore, wires in bi-filar designs are much more structurally flexible for bending and turning at stator winding end turns. Bi-filar windings, however, are subject to overheating due to cross current circulation between filars. Cross current circulation can occur when the two filars are linked by a different amount of flux and therefore have different generated voltages. This can occur if the slot segments of the first filar have a different average radial position in the core slots than the slot segments of the second filar and a phenomenon known as magnetic flux slot leakage is present. One method developed to reduce the amount of cross current circulation is to alternate radial positions between the first and second filars at each end loop. This technique, however, is complicated and expensive to manufacture.

SUMMARY OF THE INVENTION

The present invention solves the aforementioned problems through an improved stator for a dynamoelectric machine. The improved stator includes a stator core which has a plurality of axial-extending core slots. The core slots extend from a first end of the stator core to a second end of the stator core.

The stator also includes a stator winding having a plurality of phases. Each phase of the stator winding includes at least a first filar and a second filar. The first filar and second filar extend around the stator core and form a plurality of layers. Each filar has a plurality of slot segments disposed in the plurality of core slots. The slot segments are alternately connected at the first and second ends of the stator core by a plurality of end loop segments. The slot segments are configured such that at least two consecutive slot segments are disposed in substantially the same radial position relative to additional slot segments of the plurality of slot segments disposed in the respective core slots, and the at least two consecutive slot segments are disposed at differing radial distances from a central axis of the stator core.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 12 is a perspective view of a plurality of layers of end loop segments and slot segments of a stator winding according to the present invention.

DETAILED DESCRIPTION OF THE INVENTION

Figure 1:
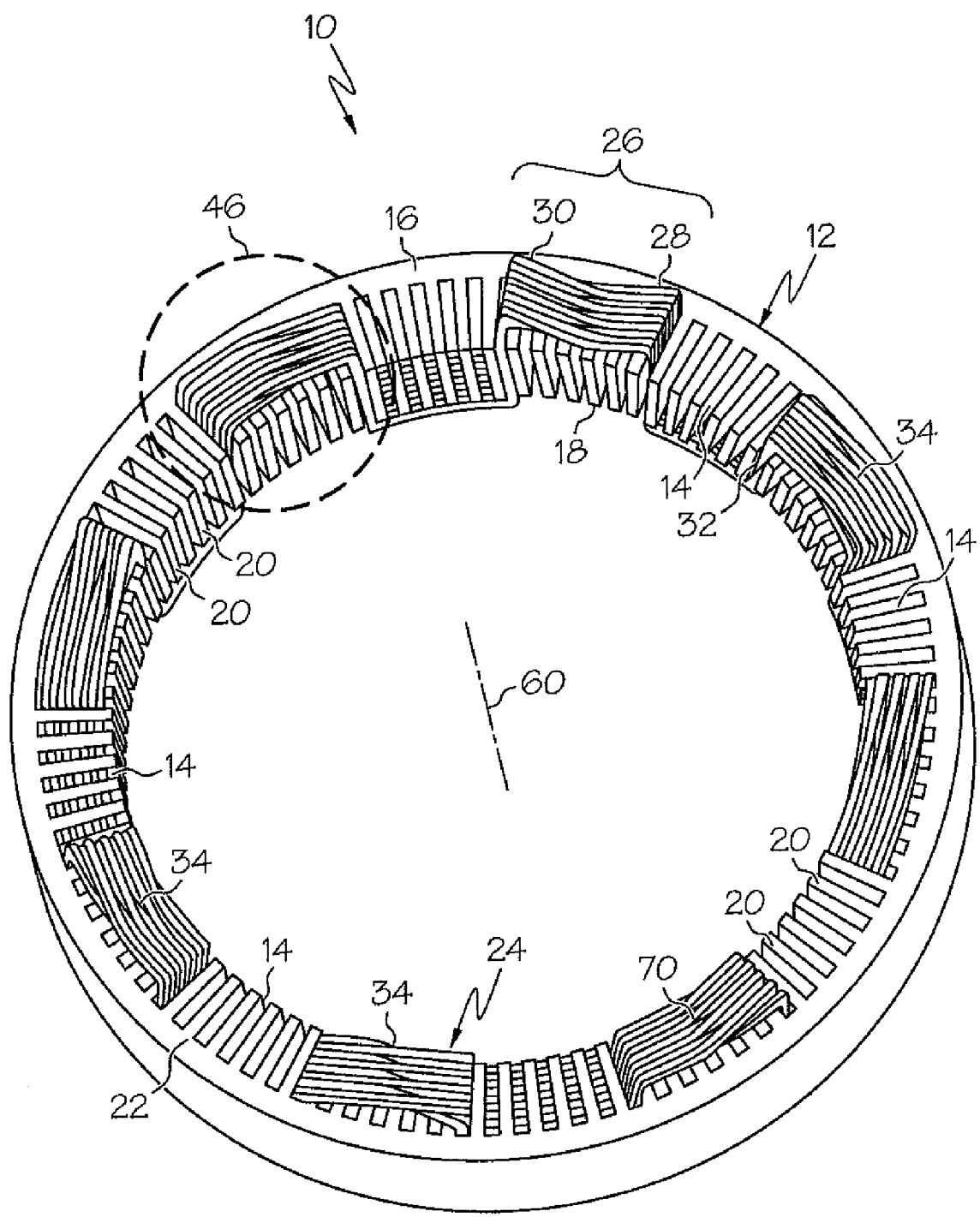
FIG. 1 is a perspective view of an example of stator core of the present invention including a single phase of the winding.

An embodiment of a stator 10 for a dynamoelectric machine is shown in FIG. 1. The stator 10 includes a stator core 12, which in the embodiment shown in FIG. 1 has a generally cylindrical shape. The stator core 12 includes a plurality of radially-directed core slots 14 circumferentially arrayed in the stator core 12. Each core slot 14 extends radially from a first end 16 of the stator core 12 to a second end 18 of the stator core 12. The plurality of core slots 14 defines a plurality of teeth 20 therebetween, where one end of each tooth 20 is connected to a yoke 22.

The stator 10 includes a stator winding 24 having a plurality of phases. Each phase includes one or more conductors 26, which in the embodiment of FIG. 1 are bi-filar, and include a first filar 28 and a second filar 30. The first filar 28 and the second filar 30 extend generally circumferentially around the stator core 12 one or more times to form at least one layer. FIG. 1 illustrates the stator core 12 with one phase of the stator winding 24 installed therein.

Figure 2:
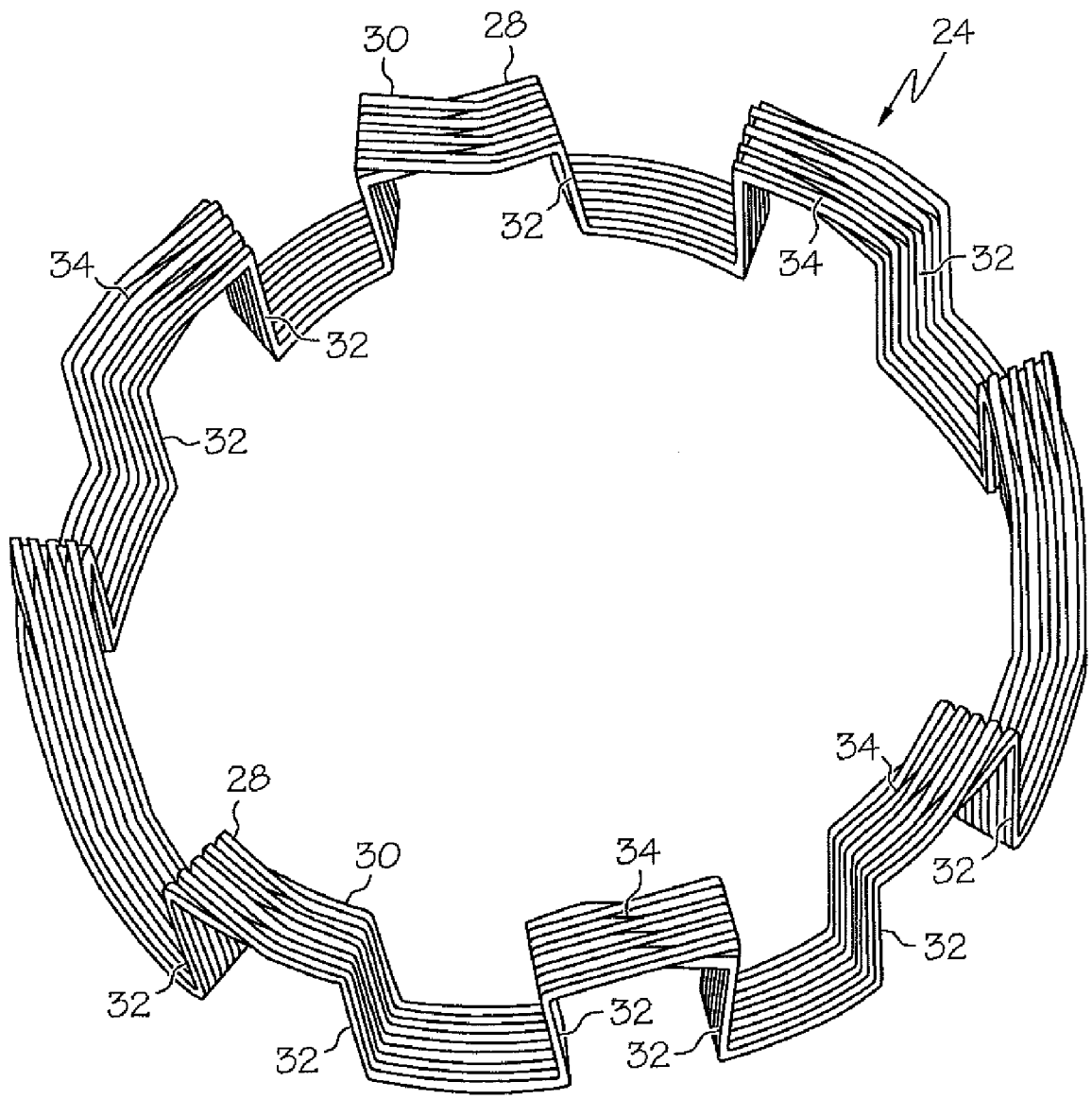
FIG. 2 is a perspective view of the winding from FIG. 1.

As shown in FIG. 2, the first filar 28 and the second filar 30 each have a plurality of slot segments 32 and end loop segments 34 connecting adjacent slot segments 32. Referring again to FIG. 1, each slot segment 32 is disposed in a core slot 14 and extends from the first end 16 to the second end 18. Each slot segment 32 is connected to adjacent slot segments 32 at the first end 16 and the second end 18 by end loop segments 34. The slot segments 32 of a particular layer of the conductor 26 are disposed in the same radial position in each of the core slots 14 that the slots segments 32 of a particular layer occupy in the stator core 12. For example, in FIG. 3, the first filar 28 of the conductor 26 in a first layer of a stator winding 24 may be disposed in the outermost radial positions in the core slots 38 and 40 relative to other conductors 26 disposed in the core slots 38 and 40, while the second filar 30 of the conductor 26 in a second layer of the stator winding 24 is disposed in the second outermost radial positions in the core slots 38 and 40 relative to other conductors 26 disposed in the core slots 38 and 40.

Figure 3:
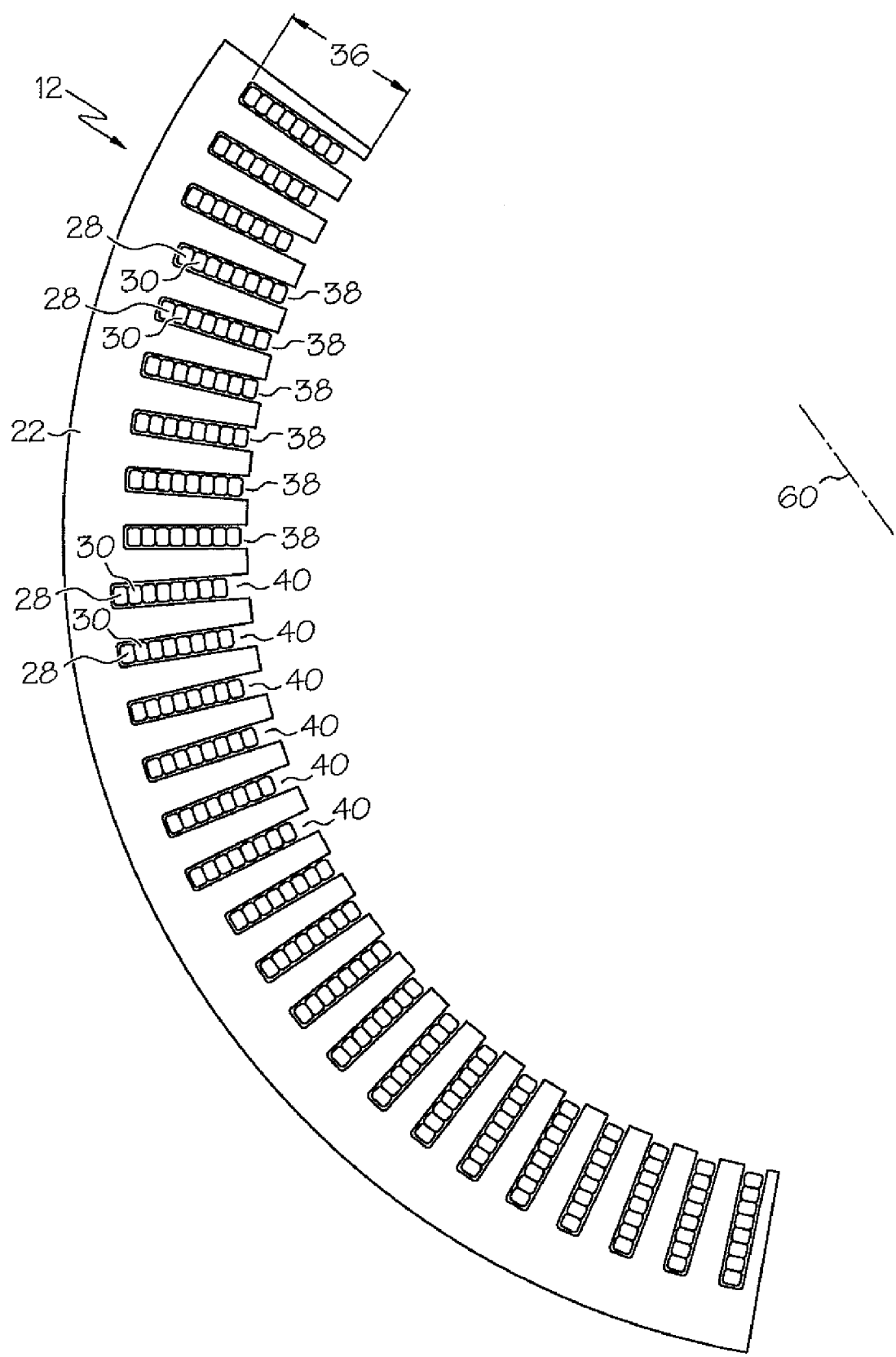
FIG. 3 is a partial sectional view of a stator core having varying core slot depths.

The slot segments 32 of a particular layer, however, may be disposed at different radial distances from the central axis 60. For example, as shown in FIG. 3, a depth 36 of core slots 14 may differ for core slots 14 in different circumferential positions in the stator core 12. In FIG. 3, a configuration is shown that alternates groups of six short slots 38 with groups of six long slots 40 around the circumference of the stator core 12. Thus, a first filar 28 and a second filar 30 disposed in the first and second outermost radial positions in the a short slot 38 will be a different radial distance from the central axis 60 of the stator core 12 than a first filar 28 and a second filar 30 disposed in the first and second outermost radial positions in a long slot 40. The configuration of FIG. 3 is shown as an example only, and other configurations may be utilized to produce a stator 10. For example, slots may alternate depth in groups of one or two, or more than two different slot depths may be utilized. In some core slots 14, a gap exists between the second filar 30 in the innermost radial position and the inner diameter of the stator core 12. The gap shown has a radial depth which is substantially equal to the radial depth of one wire. Alternatively (not shown), the long slots 40 may be longer in depth 36 than the short slots 38 by only one half of the radial depth on one wire and therefore, the gap between the second filar 30 in the innermost radial position and the inner diameter of the stator core 12 would only be substantially equal to one half the radial depth of one wire.

Figure 4:
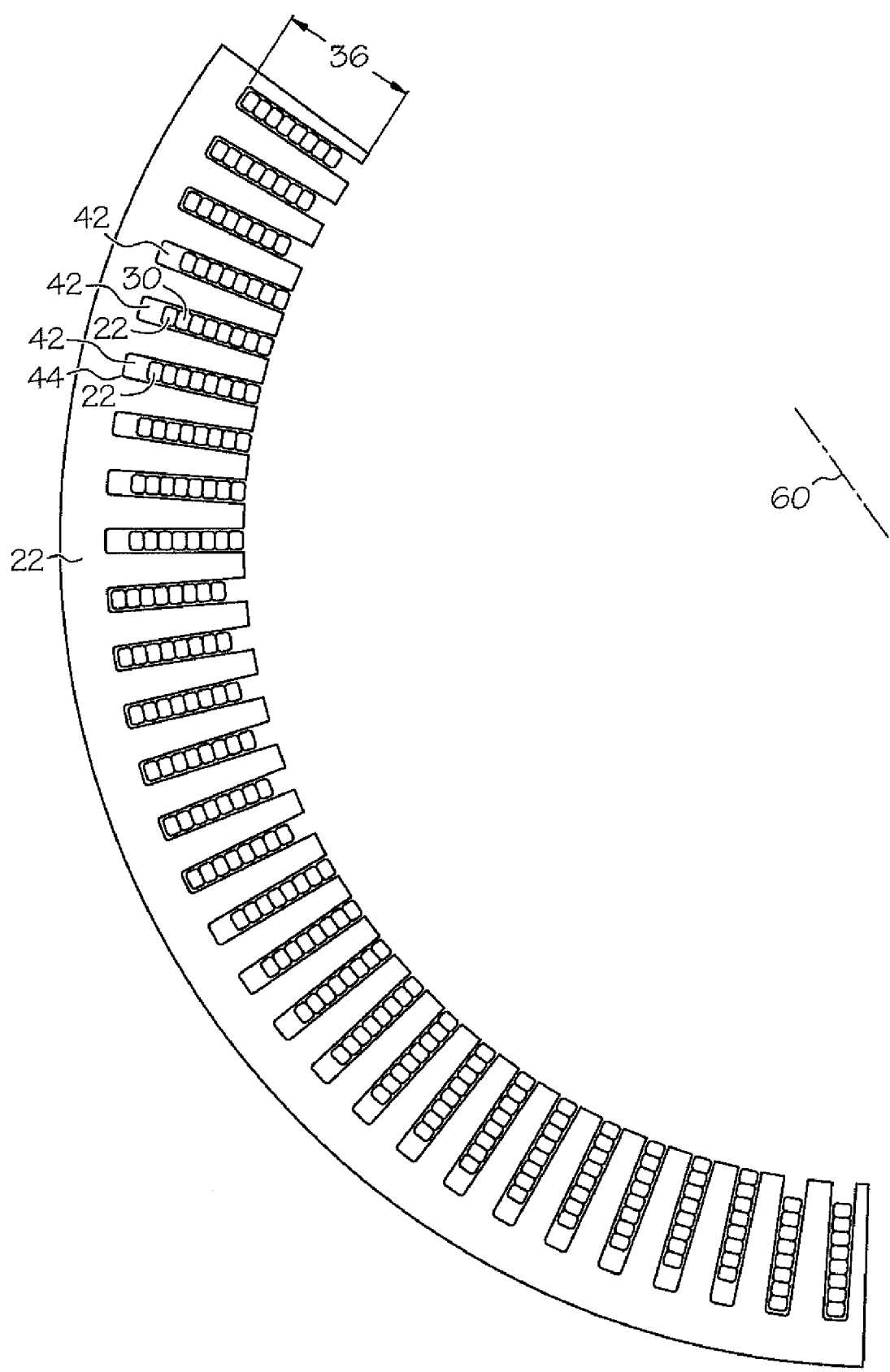
FIG. 4 is a partial sectional view of a stator core and winding where radial distance from of one or more filars to the yoke of the stator core is variable.

Alternatively, the core slots 14 may be substantially uniform in depth 36, but the slot segments 32 may be inserted therein in such a way that the radial distance of first filars 28 and second filars 30 from the central axis 60 varies with circumferential position around the stator core 12. For example, as shown in FIG. 4, in some core slots 14 a first filar 28 and second filar 30 in outermost radial positions in a core slot 14 may be installed such that there is a gap 42 between the first filar 28 and a base 44 of the core slot 14.

To reduce cross-current circulation between the first filar 28 and second filar 30, the first filar 28 and second filar 30 alternate radial locations with one another within at least one end loop segment 34 at at least one discreet location of the circumference of the stator core 12.

Figure 5:
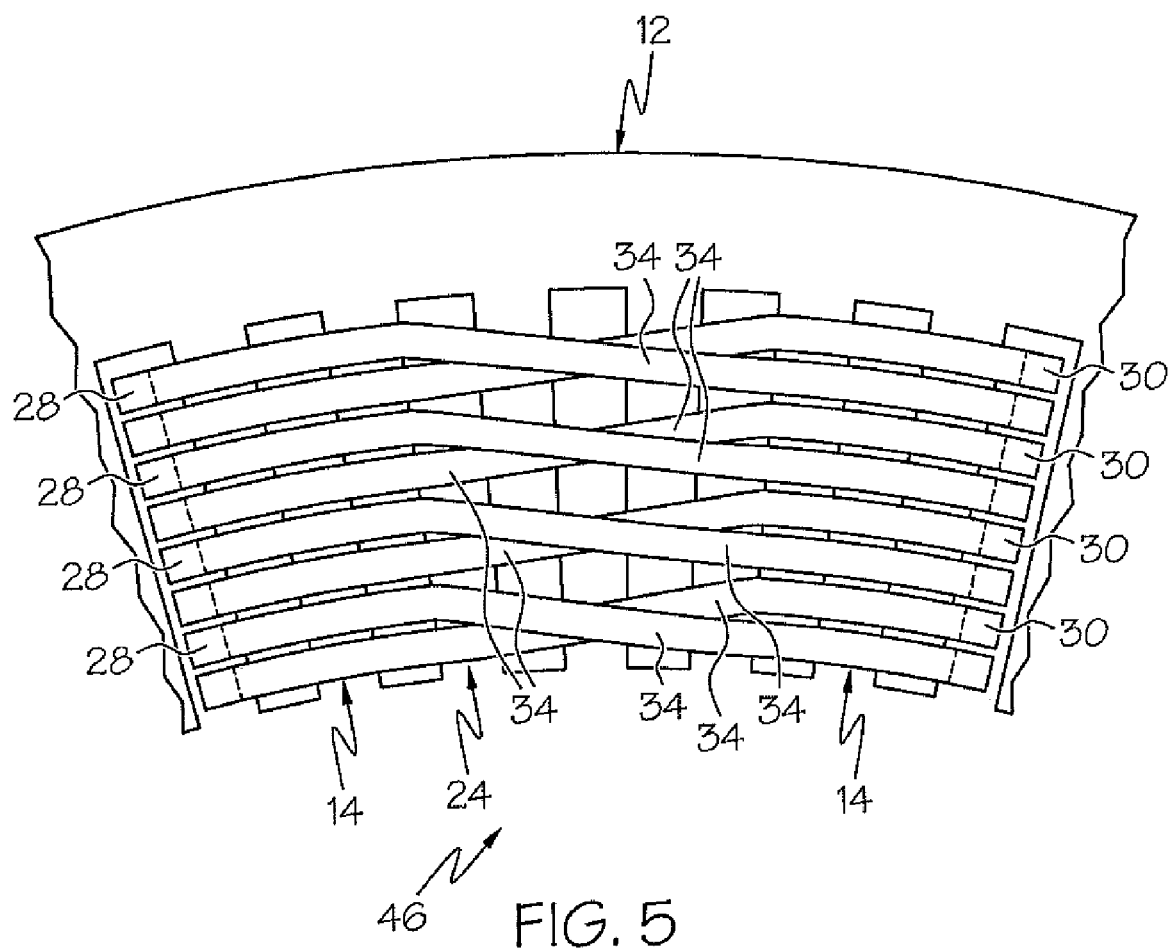
FIG. 5 is an enlarged view of the circled transition portion of FIG. 1.

In one embodiment, the first filar 28 and second filar 30 of each phase alternate radial positions within every end loop segment 34 at the first end 16 of the stator core 12. As shown in FIGS. 1, 2, and 5, the first filar 28 and second filar 30 of each phase alternate radial positions with one another in a transition 46 within each end loop segment 34 at the first end 16 of the stator core 12. In the embodiment shown, the first filar 28 and second filar 30 only alternate radial positions at one end of the stator core 12. This reduces the number of transitions 46 and makes manufacturing of the winding 24 easier and less expensive and less time consuming.

Figure 6:
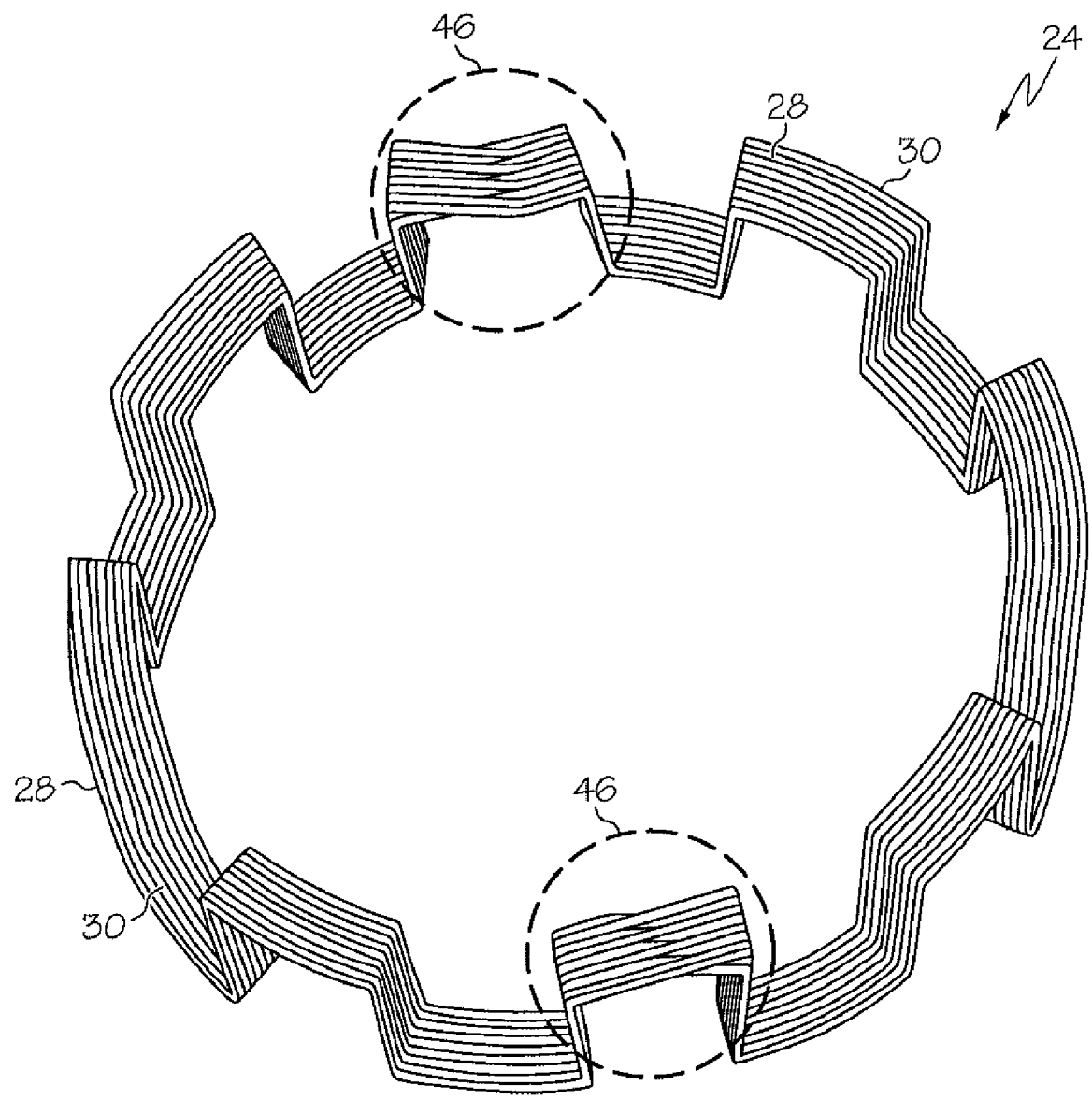
FIG. 6 is a perspective view of an alternative embodiment of the winding from FIG. 1.

In another embodiment, as shown in FIG. 6, the first filar 28 and second filar 30 alternate radial positions to form transitions 46 at two discreet locations around the circumference of the stator core 12. Once again, the alternating of radial positions only takes place at one end of the stator core 12, but in this embodiment, the first filar 28 and second filar 30 form only two transitions 46. As shown, the two transitions 46 may be located at opposite circumferential positions around the stator core 12, one-hundred and eighty degrees apart, but other relative locations of the transitions 46, for example, 90 degrees apart, 45 degrees apart, or adjacent to each other, are contemplated within the scope of this invention.

Figure 7:
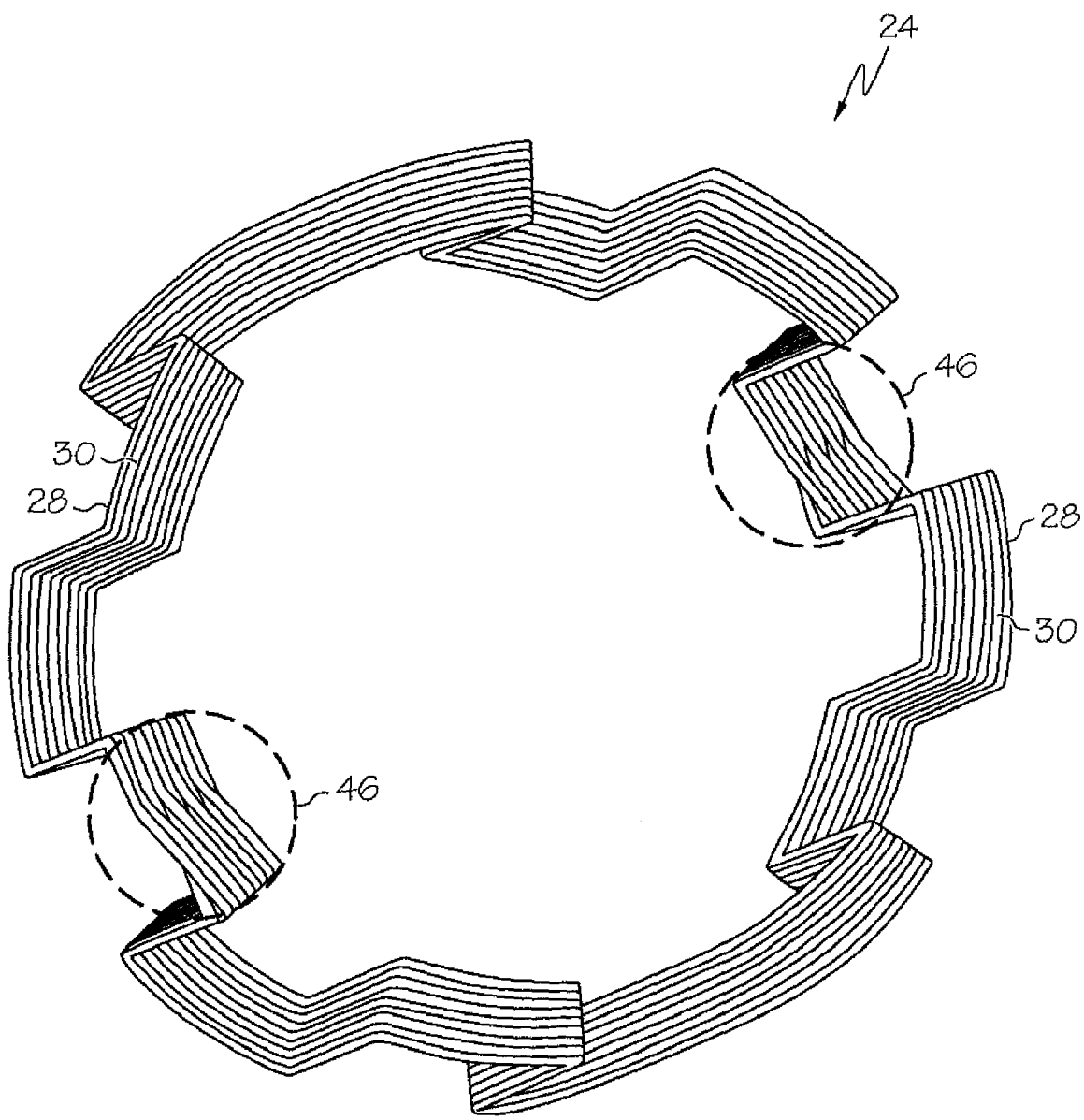
FIG. 7 is a perspective view of another alternative embodiment of the winding from FIG. 1.

In yet another embodiment, as shown in FIG. 7, the first filar 28 and second filar 30 form transitions 46 at two discreet locations around the circumference of the stator core 12, but there is at least one transition 46 formed at the first end 16 and at least one transition 46 formed at the second end 18 of the stator core 12. The two transitions 46 may be formed at opposite circumferential locations around the stator core 12, one-hundred and eighty degrees apart, but other relative locations of the transitions 34, for example, 90 degrees apart, 45 degrees apart, or adjacent to each other, are contemplated within the scope of this invention The stator winding 24 shown in FIGS. 1, 2, 6 and 7 has a wave winding configuration. A wave winding configuration is defined as a stator winding 24 including a filar or filars, such as 28 and 30, which extend in only one direction, either clockwise or counter-clockwise, for each substantial revolution around the circumference of the stator core 12. The term substantial revolution is defined as being at least 75% of one revolution.

FIGS. 1-7 show the first filar 28 having the same phase angle as the second filar 30—i.e., at a particular circumferential location, the end loop segment 34 of the first filar 28 is located on the same end of the stator core 12 as the end loop segment 34 of the second filar 30. Therefore the transitions 46 at a certain discreet location for the first filar 28 happen on the same end 16 or 18, of the stator core 12 as the transitions 46 of the second filar 30 at the same discreet location. However, it may be desirable to shift the second filar 30 a predetermined number of slots with respect to the first filar 28 such that the second filar 30 is phased 180 electrical degrees from the first filar 28—i.e., at a particular circumferential location, the end loop segment 34 of the first filar 28 is located on one end of the stator core 12 and the end loop segment 34 of the second filar 30 is located on the other end of the stator core 12. This can best be seen as end loop segments 48 and 50 of FIG. 12. For the case where the filars 28, 30 are phased 180 electrical degrees apart, the transitions 46 are formed for the two filars 28, 30 in the same discreet location, but at opposite ends of the stator core 12.

In one embodiment of the present invention, the stator winding 24 includes three filars or any odd number of filars (not shown). For a stator winding 24 having three filars, the filars form transitions 46 and alternate radial positions at the pre-mentioned discreet locations by having the outermost filar and innermost filar alternate radial positions and the middle filar remain the middle filar. For a stator winding 24 having any odd number of filars, the filars form transitions 46 and alternate radial positions at the discreet locations by having the middle filar remain the middle filar, the outermost filar alternate with the innermost filar, the second outermost filar alternate with the second innermost filar and so forth. A method to make a stator winding having three filars and a certain number of transitions 46 is similar to the method of a stator winding having two filars, described in more detail below, except two filars are flipped 180 degrees similar to the first filar described below.

In another embodiment, the stator winding 24 includes four filars or any even number of filars (not shown). For a stator winding 24 having four filars, the filars form transitions 46 and alternate radial positions at the pre-mentioned discreet locations by having the outermost filar alternate with the innermost filar and the second outermost filar alternate with the second innermost filar. For a stator winding 24 having any number of even filars, the filars form transitions 34 and alternate radial positions at the discreet locations by having the outermost filar alternate with the innermost filar and the second outermost filar alternate with the second innermost filar and so forth. A method to make a stator winding 24 having four filars or any even number of filars and a certain number of transitions 46, is to insert the filars into the core slots 14 in a sequential order up until the core slot 14 just prior to a desired transition 46 and then insert the filars in a reverse sequential order. This step can be reversed and repeated for any number of desired transitions 46.

Figure 8:
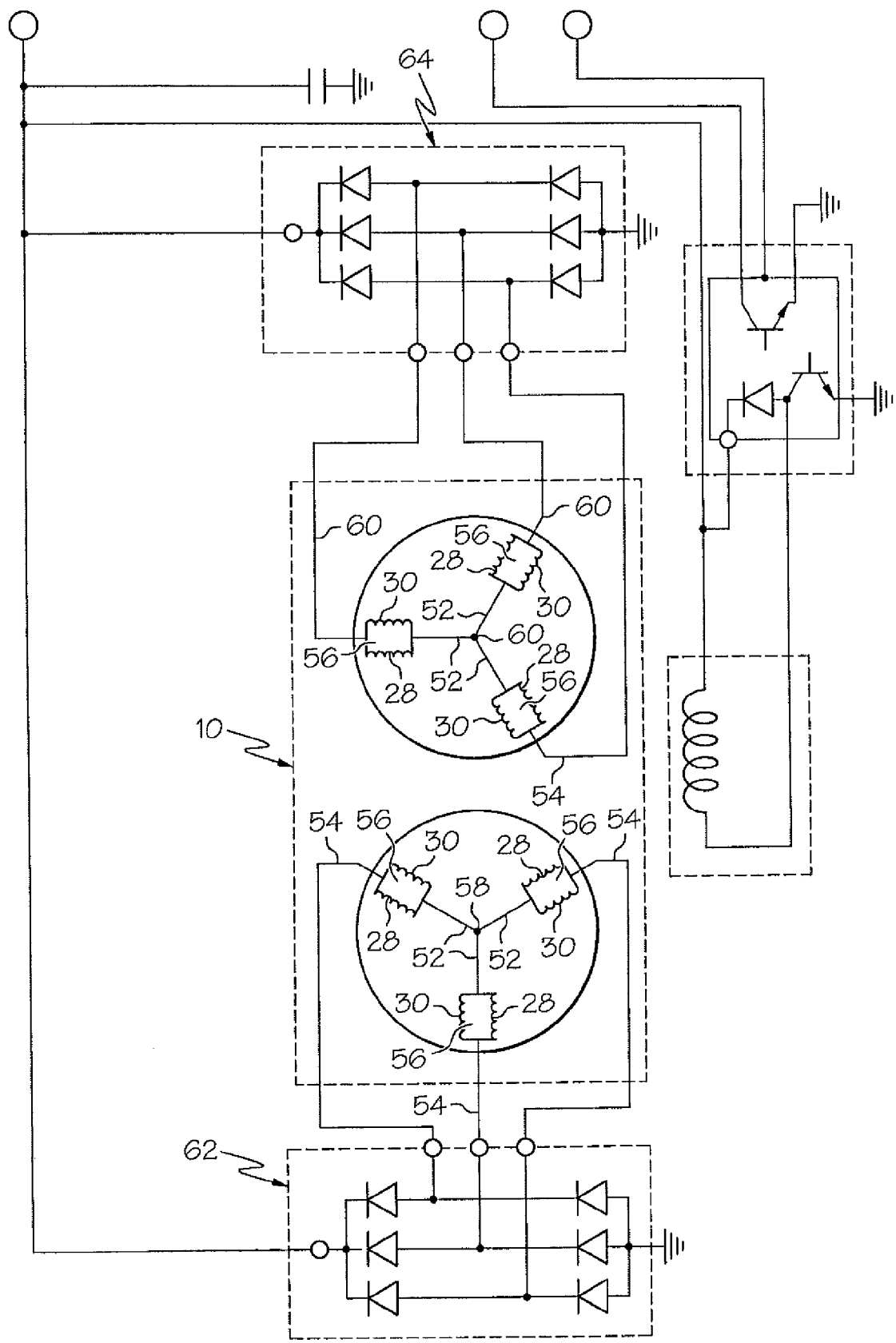
FIG. 8 is an example of a schematic view of an alternator having a stator of the present invention.

In yet another embodiment, as shown in FIG. 8, the first filar 28 and the second filar 30 of each phase each include a first end 52 and a second end 54. The first ends 52 of the first filar 28 and the second filar 30 are connected to one another and the second ends 54 of the first filar 28 and the second filar 30 are connected to one another such that the first filar 28 and second filar 30 of each phase are connected in parallel. The first ends 54 of the first filar 28 and the second filar 30 of each phase are connected to a neutral point (not shown) and the second ends 54 of the first filar 28 and the second filar 30 of each phase are connected to rectifying diodes (not shown).

In FIG. 8, the dynamoelectric machine has six phases 56 and two neutral points 58,60. A dynamoelectric machine having six phases 56 includes end loop segments 34 that connect a slot segment 32 disposed in a first particular core slot 14 with a slot segment 32 disposed in a core slot 14 that is located six core slots 14 from the first particular core slot 14, best seen in FIG. 5. The first ends 52 of the filars 28,30 of a first half of the phases 56 are connected to a first neutral point 58 and the second ends 54 of the filars 28,30 of the first half of the phases 56 are connected to a first rectifier such as first rectifying diodes 62. The first ends 52 of the filars 28,30 of a second half of the phases 56 are connected to a second neutral point 60 and the second ends 54 of the filars 28,30 of the second half of the phases 56 are connected to a second rectifier such as second rectifying diodes 64.

Referring again to FIG. 1, each of the first and second filars 28,30 is a conductor having a plurality of slot segments 32 disposed in the core slots 14. The slot segments 32 are alternately connected at the first and second ends 16, 18 of the stator core 12 by a plurality of end loop segments 34. Each of the slot segments 32 of a particular layer are in substantially the same radial position in the core slots 14 of the stator core 12 and the end loop segments 34 form a cascaded winding pattern.

Figure 9:
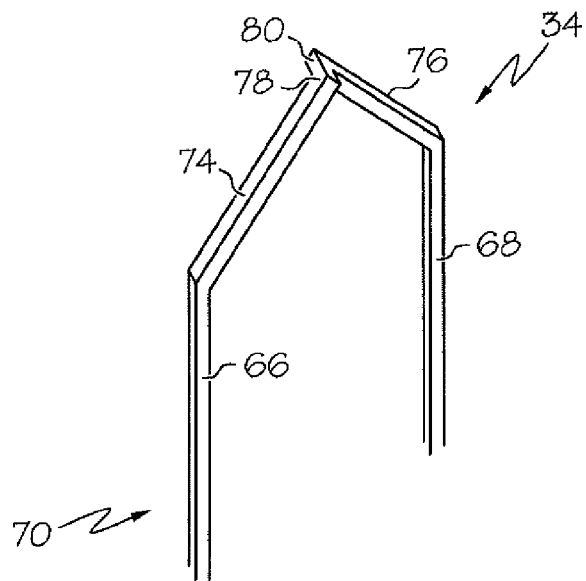
FIG. 9 is a perspective view of an example of an end loop portion of a stator winding according to the present invention.

Referring now to FIG. 9, the end loop segment 34 is adapted to be a part of the stator winding 24 and includes a first substantially straight end portion 66 and a second substantially straight end portion 68 that are each proximate to a respective slot segment 32, discussed in more detail below, of the stator winding 24. The first end portion 66 and the second end portion 68 form a portion of a layer, indicated generally at 70, of the stator winding 24 whose slot segments 32 are at a same radial position in the core slots 14. Although end portions, such as 66 and 68, are described as entities, they may, in fact, just be portions of the slot segments 32, discussed in more detail below.

The end loop segment 34 includes a first sloped portion 74 and a second sloped portion 76 that meet at an apex portion 78. The phrase sloped portion, utilized herein, refers to a portion, such as first sloped portion 74, of an end loop segment 34 connecting two slot segments 32, which extends in the axial direction as well as extending toward the next slot segment 32 disposed in a core slot 14. The first sloped portion 74 is substantially co-radial with the first end portion 66. The second sloped portion 76 is substantially co-radial with the second end portion 68, and substantially non-co-radial with the first end portion 66 and first sloped portion 74. The end loop segment 34 includes a single radial adjustment at the apex portion 78 through a radial extension portion 80. The radial extension portion 80 extends from the first sloped portion 74 in the radially outward direction, which provides a radial outward adjustment for the end loop segment 34. The use of a single radial adjustment at radial extension portion 80 results in slot segments 32 that are in the same radial position in adjacent core slots 14, but are at differing radial distances from the central axis 60. An end loop segment 34 having a single radial adjustment results in a stator winding 24 that is more easily nested in the stator core 12. Additionally, each end loop segment 34 may be of a reduced length, which shortens overall alternator package length and further reduces alternator resistance resulting in increased alternator output.

While the end loop segment 34 has been shown wherein the single radial outward adjustment is adjacent the apex portion 78, those skilled in the art can appreciate that the single radially outward adjustment can be at any one of the first sloped portion 74, the second sloped portion 76, or the apex portion 78 in order to provide the cascaded winding pattern, described in more detail below.

Figure 10:
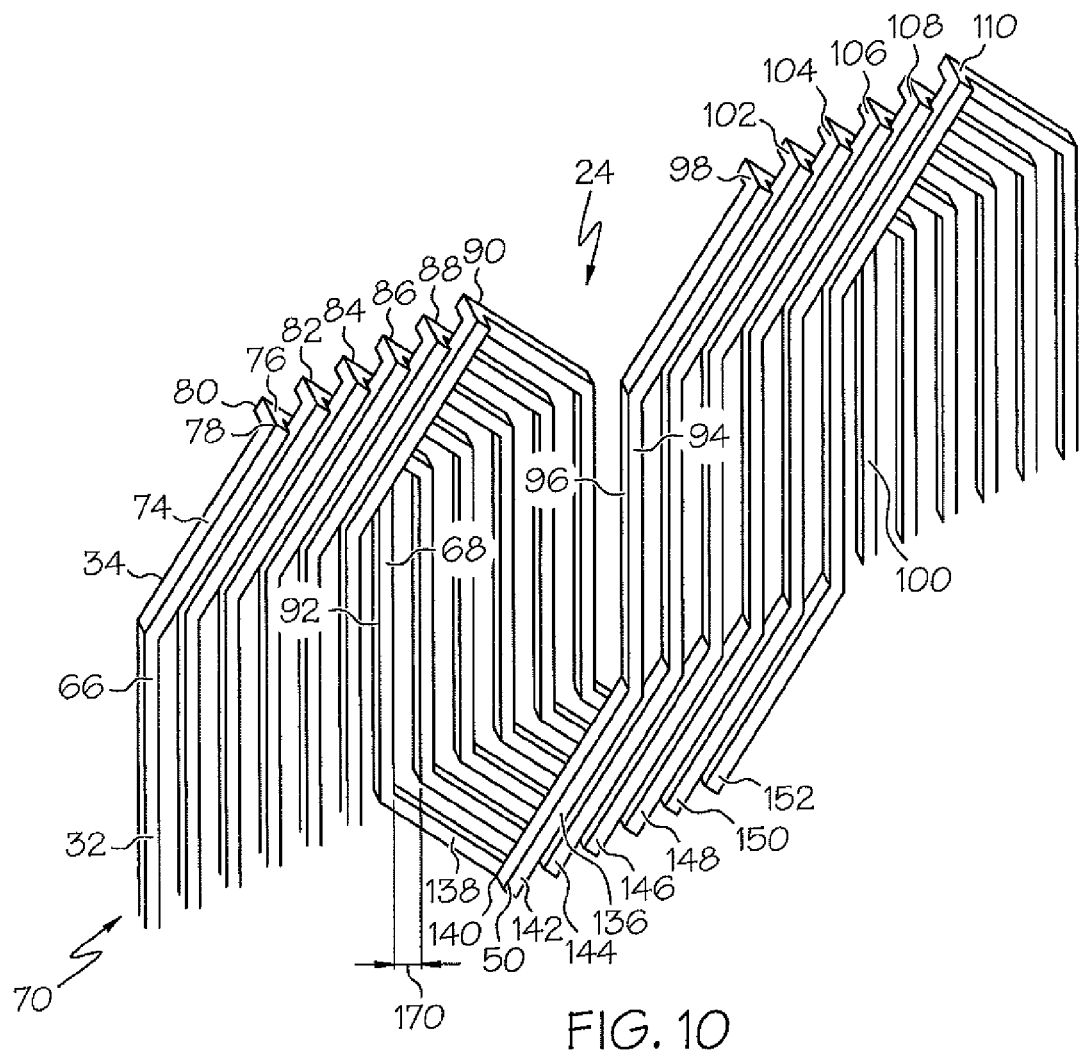
FIG. 10 is a perspective view of a layer of end loop segments of a portion of a stator winding according to the present invention.

Referring now to FIG. 10, the end loop segment 34 of FIG. 9 is shown adjacent a plurality of substantially identical end loop segments, indicated generally at 82, 84, 86, 88 and 90. The end loop segments 34, 82, 84, 86, 88 and 90 form a portion of the layer 70 of the stator winding 24. The end loop segments 34, 82, 84, 86, 88 and 90 are shown in a six-phase winding pattern but those skilled in the art will appreciate that the end loop segments 34, 82, 84, 86, 88 and 90 maybe formed in, for example, a three-phase winding pattern, or any other winding pattern advantageous for producing electricity or for generating torque, as in the case of an electric motor. The end loop segments 34, 82, 84, 86, 88 and 90 are preferably each disposed at the first end 16 of the stator core 12.

The second end portion 68 attaches to a first slot segment, shown schematically at 92, which extends through a one of the core slots 14 to the second end 18 of the stator core 12. As the first slot segment 92 exits the second end 18, the first slot segment 92 is attached to an end of another end loop segment, shown schematically at 50, which is described in more detail below. The end loop segment 50 is attached at another end to a second slot segment, shown schematically at 94. The second slot segment 94 extends upwardly through another one of the core slots 14 of the stator core 12 and attaches to a portion 96 of an end loop segment 98, which is substantially identical to the end loop segments 34, 82, 84, 86, 88 and 90. Similarly, a portion 100 of the end loop segment 98 connects to another slot segment, discussed in more detail below. The pattern of connecting end loop segments 34, 50 and 98 and slot segments, such as the slot segments 92 and 94, as outlined above, continues throughout one substantial circumference of the stator core 12 to form a first layer, such as the layer 70, of a single phase of the stator winding 24.

The end loop segment 98 is shown adjacent a plurality of substantially identical end loop segments, indicated generally at 102, 104, 106, 108 and 110. The end loop segments 98, 102, 104, 106, 108 an 110 are each connected to a corresponding plurality of slot segments, discussed in more detail below, such as the slot segments 92 and 94, which are each disposed in a respective core slot 14 of the stator core 12. The end loop segments 82, 84, 86, 88, 90, 102, 104, 106, 108 and 110, when attached to the slot segments and end loop segments, each form a respective continuous first layer of the complete stator winding 24 that is wound about the circumference of the stator core 12.

Preferably, each of the slot segments 92 and 94 and each of the end loop segment portions 34, 50, 82, 84, 86, 88, 90, 102, 104, 106, 108 and 110 are formed from a rectangular wire and have a cross-sectional shape having a substantially constant circumferential width and radial depth and therefore equal area, however, other shapes could also be employed such as round or square. For those skilled in the art, it is known that typical rectangular or square shaped conductors may include radii on the corners intermediate two adjacent edges.

Figure 11:
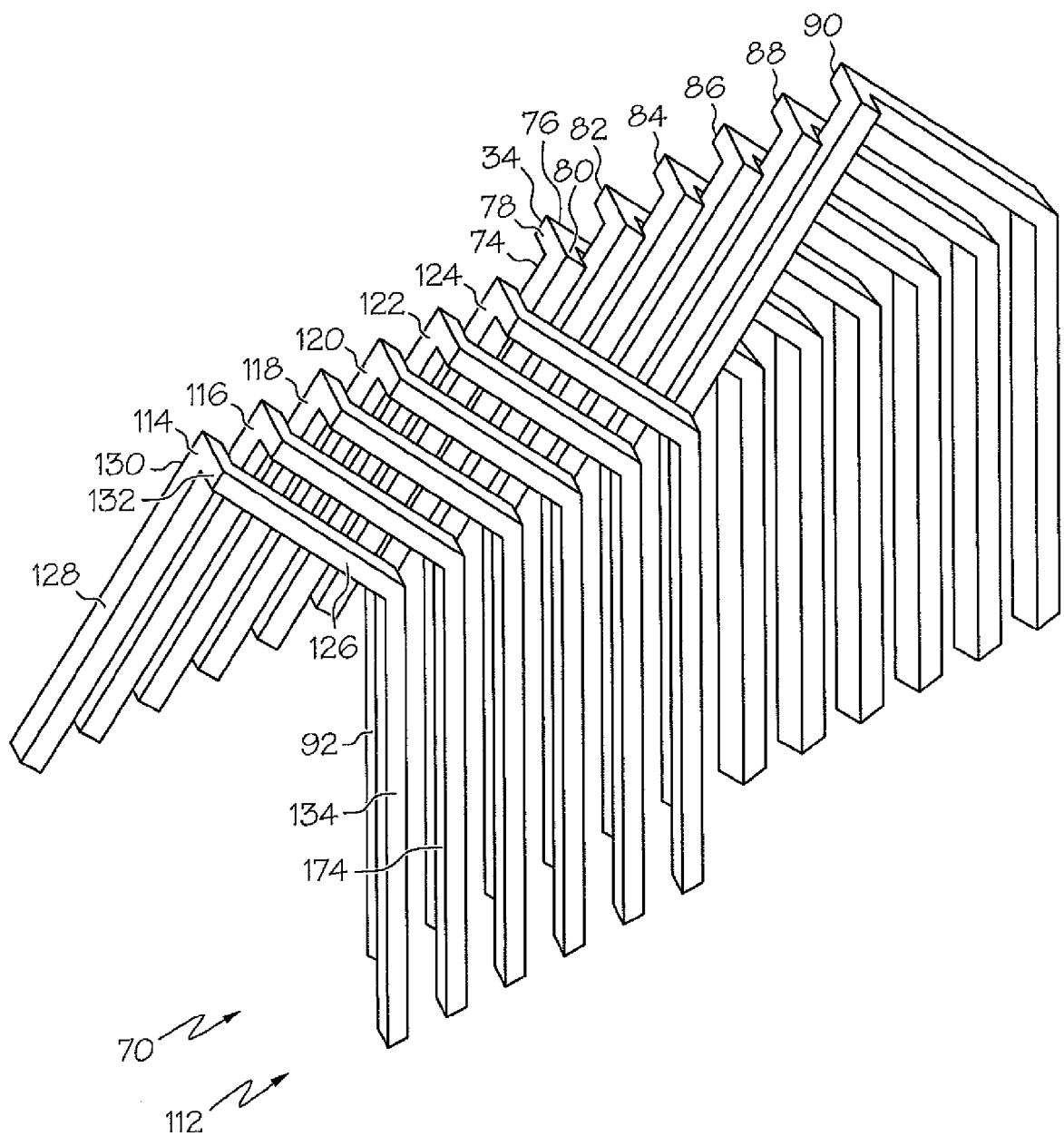
FIG. 11 is a perspective view of a plurality of layers of end loop segments of a stator winding according to the present invention.

Referring now to FIGS. 11 and 12, the first layer 70 of the end loop segments 34, 50, 82, 84, 86, 88, 90, 102, 104, 106, 108 and 110 of FIG. 10, is shown with a second layer of end loop segments indicated generally at 112. The second layer 112 is located radially inward of the layer 70 at a predetermined radial distance from the layer 70. The second layer 112 includes a plurality of end loop segments, indicated generally at 114, 116, 118, 120, 122 and 124. The layers 70 and 112 together form a portion of the stator winding, indicated generally at 24. The conductor of the second layer 112 including the end loop 114 is similar to the conductor of the first layer 70 including the end loop 34 except that it is inserted into the core slots 14, shifted by a predetermined number of slots, discussed in more detail below, and it has end loop segments, such as the end loop segment 114, that extend radially outwardly in a counterclockwise direction, which is opposite the end loop segments, such as the end loop segment 34, of the first layer 70, which extend radially outwardly in a clockwise direction.

The end loop segment 114 includes a first sloped portion 126 and a second sloped portion 128 connected by an apex portion 130. The end loop segment 114 includes a single radial adjustment at the apex portion 130 through a radial extension portion 132. The radial extension portion 132 extends from the first sloped portion 126 in the radially outward direction, which provides a radial outward adjustment for the end loop segment 114.

As can best be seen in FIG.11, the radial extension portion 132 of end loop segment 114 extends radially outward where it becomes substantially co-radial with the first end portion 66, but because it is shifted by n slots, it does not violate the space of the end loop segments of the first layer 70. This allows the end loop segments of the two layers, 70 and 112 to cascade together forming a two layer winding 24, which extends radially outward by one substantial wire width beyond the first layer 70 but does not extend radially inward beyond the innermost layer 112. In FIG. 11, layer 70 is defined as the outermost layer and layer 112 is defined as the second outermost layer. Although the radial extension portions, such as 124, appear as sharp bends, it is obvious to those skilled in the art that typical radial extension portions may be more gentle in nature and include radii, not shown.

For a winding with a plurality of layers, a third layer (not shown and defined as the third outermost layer) which is substantially identical to the first layer 70, would have extension portions that would extend radially outward and be substantially co-radial with portions of the second layer 112 and therefore cascade with the second layer 112. Typically, the beginning of first filar 28 disposed in the third outermost layer would be connected to the end of the first filar 28 disposed in the outermost layer 70. For a pattern where the radial layers alternate between being substantially identical with the first layer 70 and the second layer 112, a pattern develops where the winding 24 only extends radially outward by one wire width for the outermost layer 70 but not radially inward of the innermost layer. As can be seen in FIG. 12, the slot segments are arranged in pairs such as slot segment 92 and slot segment 134. These pairs of slot segments, 92 and 134, will be housed in the same core slot 38 after insertion into the stator core 12. One method to achieve a winding having the radial layers alternate between being substantially identical to the first layer and second layer, is to wind the first filar 28 as layer 70 and the second filar 30 as layer 112 as in FIG. 12 in a linear fashion such that, for a stator core 12 having X core slots, the linear winding has approximately 2X slot segment pairs. Prior to inserting the winding 24 into the core slots 38 and 40, the winding 24 would be wrapped concentrically such that the X+1 pair of slot segments from the first pair of slot segments, 92 and 134, is located just inward of slot segments 92 and 134 and therefore, after insertion into the stator core 12, will be housed in the same core slot 38 or 40 as slot segments 92 and 134. Consequently the X+2 pair of slot segments would be housed in the same core slot 38 as slot segment 174 and so forth. In this method, after insertion of winding 24 into stator core 12, the first filar 28 is a continuous wire (does not require a connection method such as a weld) located in the outermost layer 70 and the third outermost layer (not shown), while the second filar 30 is a continuous wire located in the second outermost layer 112 and in the fourth outermost layer (not shown). Consequently, in a certain core slot 14, the slot segments of the first filar 28 are disposed in the outermost radial position and the third outermost radial position and the slot segments of the second filar 30 are disposed in the second outermost radial position and the fourth outermost radial position. This cascading effect allows a winding 24 with a plurality of layers to be inserted into a stator core 12, that extend radially outwardly by one wire width while not extending radially inwardly. The end loop segments 116, 118, 120, 122 and 124 are substantially identical to the end loop segment 114. The radial outward and inward adjustments for the layers 70 and 112 form a cascaded winding pattern shown in FIGS. 11 and 12.

Referring again to FIG. 12, the first layer 70 and the second layer 112 are shown with a plurality of slot segments 134 and 136, respectively, which are substantially identical to the slot segments 92 and 94. Referring now to FIG. 10, the end loop segment 50 is shown having a first sloped portion 136 and a second sloped portion 138 connected by an apex portion 140. The first sloped portion 136 is substantially co-radial with the slot segment 94. The second sloped portion 138 is substantially co-radial with the second sloped portion 68 and slot segment 92. The apex portion 140 includes a radial extension portion 142. The radial extension portion 142 extends from the first sloped portion 136 in the radially outward direction, which provides a radial outward adjustment for the end loop segment 50. The end loop segments 144, 146, 148, 150 and 152 are substantially identical to the end loop segment 50.

Referring again to FIG. 12, an end loop segment 154 of the second layer 112 is shown adjacent the end loop segment 152 of the first layer 70. The end loop segment 154 includes a first sloped portion 156 and a second sloped portion 158 connected by an apex portion 160. The first sloped portion 156 is substantially co-radial the slot segment 134 connected to first sloped portion 156. The second sloped portion 158 is substantially co-radial with the slot segment 134 connected to the second sloped portion 158. The apex portion 160 includes a radial extension portion 162. The radial extension portion 162 extends from the first sloped portion 156 in the radially inward direction, which provides a radial adjustment for the end loop segment 154. The end loop segments 164, 166, 168, 170 and 172 are substantially identical to the end loop segment 154.

The slot segments 92, 94, and 134 of each phase of the stator winding 24 are preferably disposed in respective core slots 14 at an equal pitch around the circumference of the stator core 12. Specifically, a slot segment of a phase, such as the slot segment 92, is disposed in a respective core slot 14 adjacent a slot segment 174 of the adjacent phase. The respective slot segments 92 and 174 are spaced apart by a circumferential distance or pitch 176, best seen in FIG. 10. The circumferential pitch 170 is substantially equal to the circumferential distance between a pair of adjacent core slots 14 in the stator core 12. Each of the slot segments and end loop segments of the phase including the slot segment 92 may remain disposed adjacent the respective slot segments and end loop segments of the phase including the slot segment 174 at the same circumferential pitch 176 throughout the length of the stator winding 24 and throughout the circumference of the stator core 12.

The width of each of the slot segments 126, including any insulation, preferably fits closely to the width of the core slots 14, including any insulation.

The windings 24 shown in FIGS. 11 and 12 are only shown in a linear state for ease of description. It is well known to those skilled in the art that these windings 24 are, in fact, curved after they are inserted into the core slots 14 of the stator core 12.

While embodiments of the invention have been described above, it will be understood that those skilled in the art, both now and in the future, may make various improvements and enhancements which fall within the scope of the claims which follow. These claims should be construed to maintain the proper protection for the invention first described.

What is claimed is:

1. A stator for a dynamoelectric machine comprising:
   a stator core, the stator core having a plurality of axial-extending core slots, the core slots extending from a first end of the stator core to a second end of the stator core;
   a stator winding having a plurality of phases, each phase including one or more filars extending around the stator core forming a plurality of layers; and
   the one or more filars having a plurality of slot segments disposed in the plurality of core slots, the slot segments alternately connected at the first and second ends of the stator core by a plurality of end loop segments, at least two consecutive slot segments of the one or more filars disposed in substantially the same radial position in their respective core slots relative to each additional slot segments of the plurality of slot segments disposed in the respective core slots, the at least two consecutive slot segments disposed at differing radial distances from a central axis of the stator core.

2. The stator of claim 1 wherein at least one of the end loop segments of consecutive slot segments located at the same radial position from the central axis includes a single radial adjustment to form a winding pattern.

3. The stator of claim 1 wherein at least one slot segment of the at least two slot segments is disposed in a long slot having a greater depth than short slots in which the remaining slot segments of the at least two slot segments are disposed.

4. The stator of claim 3 wherein half of the core slots are further defined as long slots and half of the slots are further defined as short slots.

5. The stator of claim 3 wherein the core slots, for a portion of the stator core, are configured to alternate groups of the long slots with groups of the short slots.

6. The stator of claim 3 wherein the groups of the long slots are comprised of six long slots.

7. The stator of claim 1 wherein there is a gap between at least one slot segment of the at least two slot segments and a base of the core slot in which the at least one slot segment is disposed.

8. The stator of claim 1 wherein there is a gap between at least one slot segment of the at least two slot segments and an inner diameter of the stator core in which at least one slot segment is disposed.

9. The stator of claim 8 wherein the gap has a radial depth which is greater than or equal to one half the radial depth of the slot segment.

10. The stator of claim 1 wherein each phase includes a first filar and a second filar.

11. The stator of claim 10 wherein the first and second filars alternating radial positions with each other at least one circumferential location around the stator core.

12. The stator of claim 10 wherein the first and second filars of each phase are connected to each other in parallel.

13. The stator of claim 12 wherein a first end of each filar is connected to a neutral point and a second end of each filar is connected to a rectifier.

14. The stator of claim 1 wherein the end loop segments of a particular layer include a first sloped portion substantially co-radial with the slot segments of the particular layer and a second sloped portion, the first and second sloped portions connected by an apex portion.

15. The stator of claim 1 having at least three layers and wherein at least one of the layers is shifted a predetermined number of core slots from at least one other of the three layers.

16. The stator of claim 15 wherein each phase includes a first filar and a second filar and for at least a portion of the winding including at least three adjacent slot segments, the first filar is disposed in an outermost layer and a third outermost layer and the second filar is disposed in a second outermost layer.

17. The stator of claim 16 wherein for the portion of the winding including at least three adjacent slot segments, the first filar is formed of a continuous wire.

18. The stator of claim 16 wherein the slot segments of the first filar are disposed in an outermost and third outermost radial positions and the slot segment of the second filar is disposed in a second outermost radial position, in at least one of the core slots.

19. The stator of claim 17 wherein the slot segments of the first filar are disposed in an outermost and third outermost radial positions and the slot segment of the second filar is disposed in a second outermost radial position, in at least two adjacent core slots.

20. The stator of claim 1 wherein the plurality of phases is six phases.

21. The stator of claim 1 wherein at one or more filars of a particular phase has slot segments disposed in every sixth core slot.

22. The stator of claim 1, wherein at least three consecutive slot segments of the one or more filars are disposed in substantially the same radial position in their respective core slots relative to additional slot segments of the plurality of slot segments disposed in the respective core slots, the at least two consecutive slot segments disposed at differing radial distances from a central axis of the stator core.

* * * * *